United States Patent [19]

Hahn et al.

[11] Patent Number: 5,764,008
[45] Date of Patent: Jun. 9, 1998

[54] DRIVE DEVICE FOR CLOSING PARTS IN MOTOR VEHICLES

[75] Inventors: Ferdinand Hahn, Diessen; Ulrich Henschel, München, both of Germany

[73] Assignee: Webasto Karosseriesysteme GmbH, Stockdorf, Germany

[21] Appl. No.: 609,438

[22] Filed: Mar. 1, 1996

[30] Foreign Application Priority Data

Mar. 3, 1995 [DE] Germany .................. 195 07 541.2

[51] Int. Cl.⁶ ........................................... H02P 1/00
[52] U.S. Cl. ................... 318/256; 318/461; 318/463; 318/466; 318/469
[58] Field of Search ................... 296/210, 221; 49/26, 28, 43, 138; 318/461, 463, 466, 469, 280, 281, 282, 283, 284, 285, 286

[56] References Cited

U.S. PATENT DOCUMENTS 4,561,691 12/1985 Kawai et al. .
4,581,981 4/1986 Kusiak .
4,736,144 4/1988 Chun-Pu ..................... 318/467

*Primary Examiner*—William M. Shoop, Jr.
*Assistant Examiner*—Kim Lockett
*Attorney, Agent, or Firm*—Sixbey, Friedman, Leedom & Ferguson; David S. Safran

[57] ABSTRACT

Drive device for closing parts in motor vehicles, especially sliding roofs, sliding/lifting roofs, and the like, with a drive motor, a sensor for determining the actual rpm of the drive motor and a clamping protection means for disengaging or for reversing the direction of rotation of the drive motor when the danger of clamping of the closing parts arises. The device has a speed controller which delivers an actuating signal which is a function of the deviation of the actual speed from a set speed of the drive motor. The drive device also includes an actuating means for varying the supply voltage delivered to the drive motor depending on the actuating signal of the speed controller, and an evaluation means which triggers the clamping protection means and which determines the existence of incipient clamping based on a signal which is dependent on the actuating signal of the speed controller.

5 Claims, 3 Drawing Sheets

DRIVE DEVICE FOR CLOSING PARTS IN MOTOR VEHICLES

BACKGROUND OF THE INVENTION

1. Field of the Invention

The invention relates to a drive device for closing parts in motor vehicles, especially sliding roofs, sliding/lifting roofs, and the like, with a drive motor, a sensor for determining the actual rpm of the drive motor, and a clamping protection means for disengaging or for reversing the direction of rotation of the drive motor when the danger of clamping arise.

2. Description of Related Art

In U.S. Pat. No. 4,585,981, a known device of this type is disclosed in which a primary position detector produces an actual position value which corresponds to the actual position of the closing part. The known device, furthermore, has a first differentiator which forms a speed signal, which corresponds to the displacement speed of the closing part, from the actual position signal, and a second differentiator which forms an acceleration signal which corresponds to the acceleration or slowing down of the closing part from the speed signal. A clamping signal which signals incipient clamping is generated by an evaluator from the speed signal and the acceleration signal. The known drive device does not make it possible to keep the adjustment speed of the closing part constant, since recognition of the danger of clamping is based on a fluctuation of rpm with a variable load torque. Therefore, a speed control for the drive motor is not provided.

In U.S. Pat. No. 4,561,961, a safety device for a electromechanical opening and closing mechanism of, e.g., a vehicle sunroof, is disclosed in which the voltage of the motor current is evaluated to determine the load on the drive motor, the drive motor being stopped or its direction of operation reversed upon detection of an overload condition resulting from, for example, a foreign object being caught in the sunroof mechanism. However, use of the safety device of this patent requires a considerable additional circuit cost for voltage measurement.

SUMMARY OF THE INVENTION

The primary object of the present invention is to provide a drive device of the type mentioned initially which allows the displacement speed of the closing part to be controlled without measuring the motor current.

This object is achieved according to the invention by providing a drive device of the initially mentioned type with a speed controller which delivers an actuating signal which is a function of the deviation of the actual speed from a set speed of the drive motor, with an actuating means for varying the supply voltage supplied to the drive motor depending on the actuating signal of the speed controller, and with an evaluation means which triggers the clamping protection means and which determines the existence of incipient clamping based on a signal which is dependent on the actuating signal of the speed controller.

The drive device according to the invention is not dependent on the relationship between the motor current and the delivered torque of the drive motor when the danger of clamping is recognized. Consequently, the circuit cost for current measurement can be saved. Moreover, advantageously, the drive can be operated at a constant speed.

The drive device according to the invention is suitable not only for displaceable roofs, but also for closing parts in motor vehicles, for example, for window raisers.

DETAILED DESCRIPTION OF THE PREFERRED EMBODIMENTS

Figure 1:
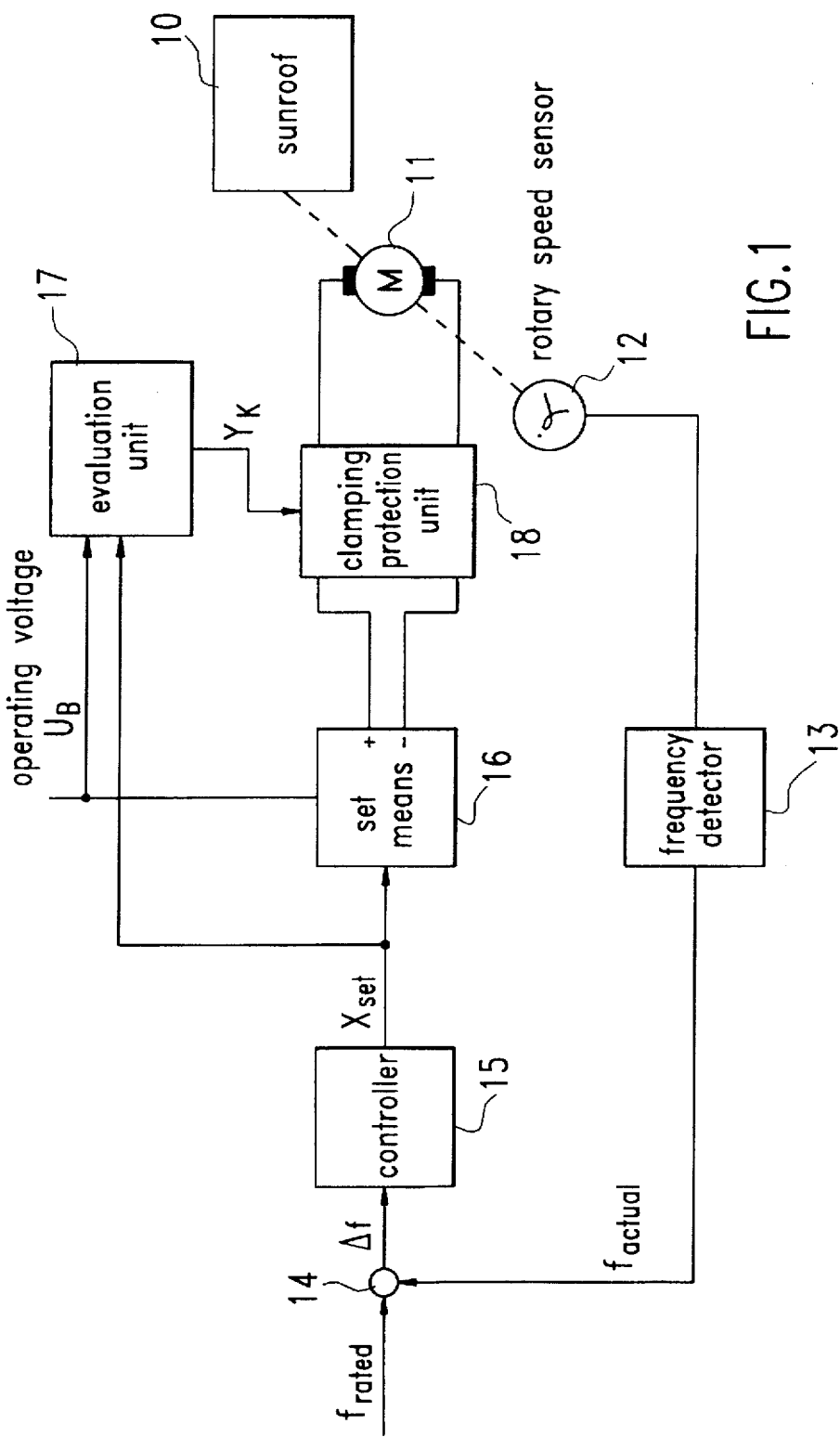
FIG. 1 shows a block diagram of a drive device according to a first embodiment of the invention.

In FIG. 1, an adjustable vehicle roof 10, especially a sliding roof, sliding/lifting roof, and the like, is coupled to a drive motor 11, which is supplied with DC voltage from an on-board current source (generator or battery) via a displacement mechanism (not shown). A tachosignal transducer 12 is connected to drive motor 11. Advantageously, the tachosignal transducer 12 is formed by an incremental position detector, which is often present anyway in these roofs, which delivers counting pulses when the roof is being displaced, with a pulse frequency which is a function of the speed of the drive motor, and thus, also the displacement speed of the roof. A frequency meter 13 is connected downstream of the tachosignal transducer 12, and delivers a signal $f_{actual}$, which represents the actual speed, to comparator 14. Furthermore, a signal $f_{rated}$, which represents the set speed, is also delivered to comparator 14, and the comparator forms signal $\Delta f$ as the system deviation based on the difference between the signals $f_{actual}$ and $f_{rated}$. Signal $\Delta f$ is sent as an input signal to a speed controller 15. Depending on signal $\Delta f$, speed controller 15 generates an actuating signal $X_{set}$ which forms one of two input signals of actuating set means 16 which determines a supply voltage $U_{motor}$ which is supplied to drive motor 11, such that drive motor 11 runs with the set speed (corresponding to $f_{rated}$).

Actuating signal $X_{set}$, furthermore, travels to evaluation means 17 where it is input along with a signal $U_B$ which represents the operating voltage of the actuating means. Evaluation means 17 controls a clamping protection means 18 which is connected to the feed circuit of the drive motor 11.

In operation, the speed of drive motor 11 is controlled by the speed controller 15 to a constant value by triggering actuating set means 16 via actuating signal $X_{set}$ such that the actuating set means 16 selects a motor voltage at which, regardless of the respective load torque, the desired motor speed is set. If the disturbance "load torque" changes in this control circuit, the triggering of actuating set means 16 is re-adjusted in order to, again, achieve the selected speed. As a result, actuating signal $X_{set}$ which triggers actuating means 16, simulates a function of the load torque. Evaluation means 17 can, therefore, acquire the load torque and it is designed such that it stops drive motor 11 or reverses its direction of rotation if the load torque exceeds a selected limit value which indicates the existence of a danger of clamping, e.g., an object being clamped between the moving part (sunroof panel or window) and the vehicle part relative to which it moves (fixed roof or vehicle door frame defining the opening which is opened or closed by the sunroof panel or window, respectively).

In a circuit layout according to FIG. 1, however, fluctuations of the operating voltage $U_B$ are corrected with manipulated variable $X_{set}$ i.e., operating voltage $U_B$ of actuating means 16 is input as another control parameter. Therefore, $U_B$, as another input signal, is sent to evaluation means 17, which is designed so that its output clamping signal $Y_K$ will not be affected by fluctuations of operating voltage.

Figure 2:
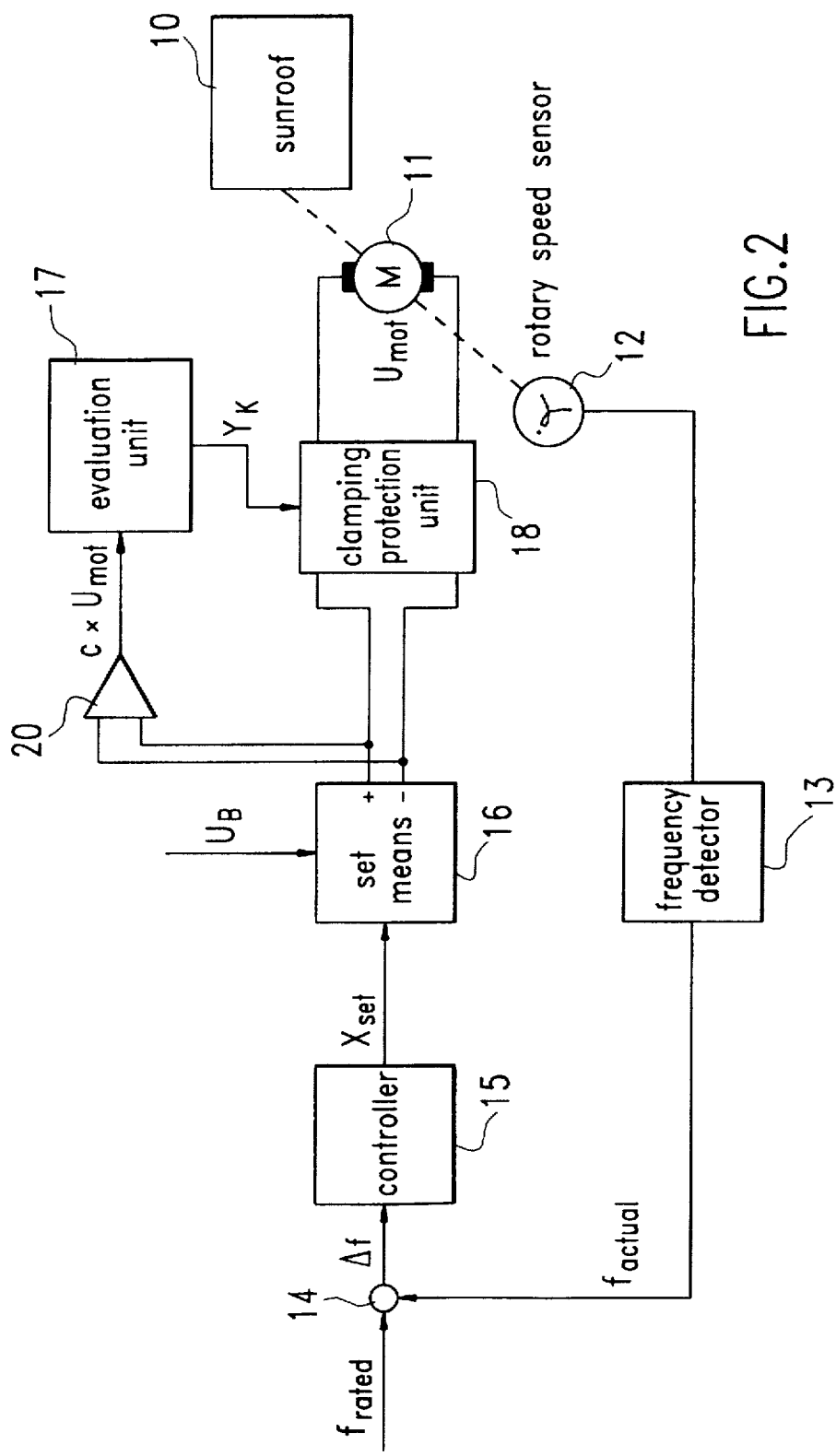
FIG. 2 shows a block diagram of a drive device according to a modified embodiment of the invention.

FIG. 2 shows a modified embodiment in which signal c x $U_{mot}$ which corresponds to motor voltage $U_{mot}$ is sent to evaluation means 17'.

In operation of the device according to FIG. 2, the speed of drive motor 11 is controlled via speed controller 15 in the manner described above. The circuit, however, is designed such that the output quantity of actuating means 16 is evaluated directly, i.e., motor voltage $U_{mot}$ which is on drive motor 11, multiplied by factor c which is determined by amplifier stage 20, not the actuating signal $X_{acr}$. In this circuit design, the effect of operating voltage $U_B$ of actuating means 16 as the disturbance variable is no longer obtained. Voltage $c \times U_{mot}$ is, rather, only a function of the load torque.

Figure 3:
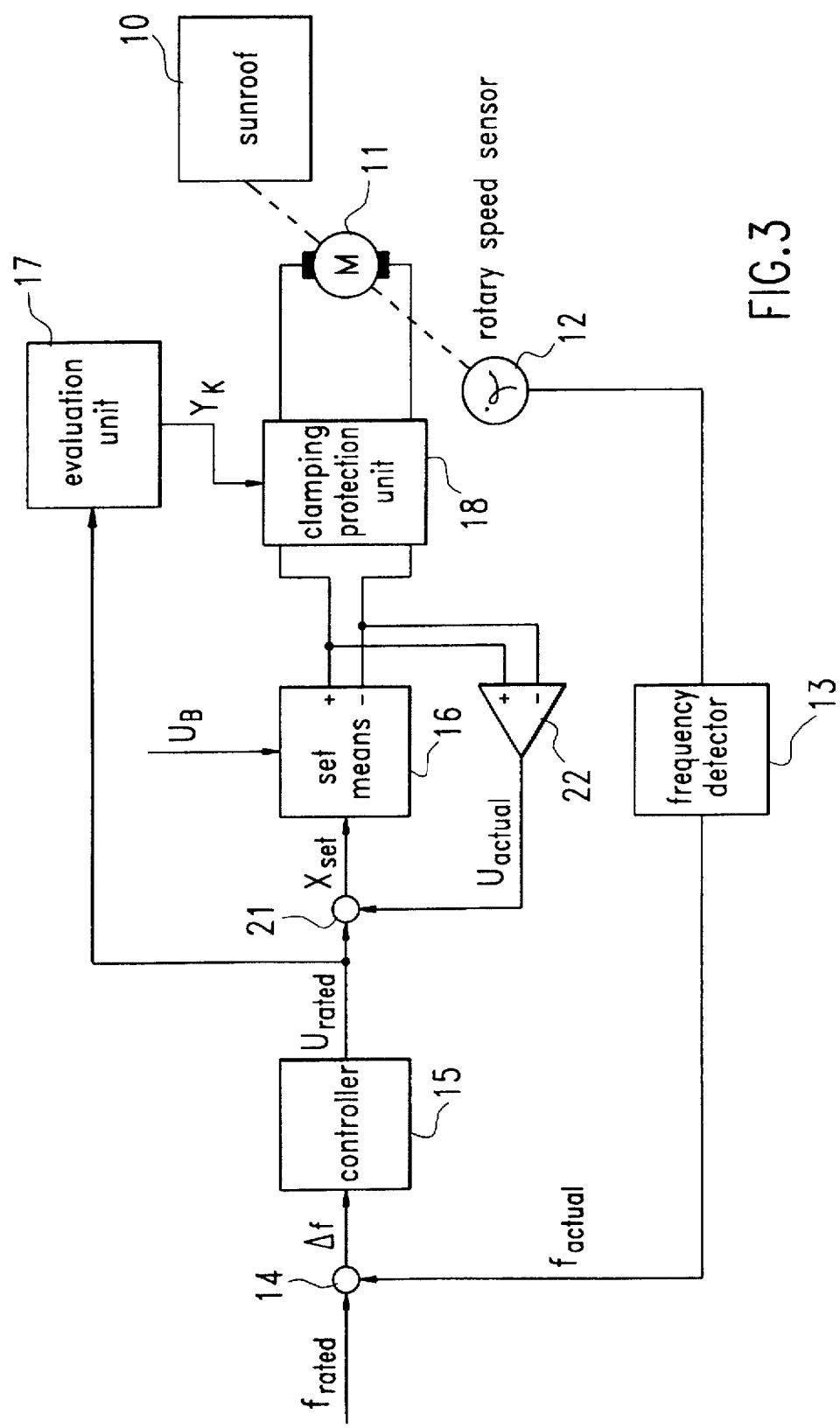
FIG. 3 shows a block diagram of a drive device according to a another embodiment of the invention.

In the further modified embodiment according to FIG. 3, voltage regulator 21 is connected between actuating means 16 and the speed controller 15. The actuating signal of speed controller 15 travels to voltage regulator 21 as well as to evaluation means 17 and forms setpoint $U_{rated}$ for voltage regulator 21. There is, furthermore, an actual signal $U_{acnu\text{-}a}$ which corresponds to the motor voltage on voltage regulator 21 via amplifier stage 22. The output signal of voltage regulator 21 is sent to actuating means 16 as actuating signal $X_{ser}$. Voltage regulator 21 controls the motor voltage such that, regardless of operating voltage $U_B$, a motor voltage is produced which corresponds to controlled variable $U_{rated}$. Thus, this controlled variable is again dependent only on the disturbance "load torque"; it can be used directly for evaluation by evaluation means 17 in order to signal incipient clamping by clamping signal $Y_K$, and to stop or reverse drive motor 11 when the load torque exceeds the designated limit value.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We Claim:

1. Drive device for closing parts in motor vehicles comprising a drive motor, a sensor for determining an actual rpm value of the drive motor and a clamping protection means for discontinuing rotation of the drive motor in a then-occurring direction of rotation when a danger of clamping of the closing parts arises, a speed controller which produces an actuating signal which is a function of a deviation of the actual speed of the drive motor from a set speed of the drive motor, an actuating means for varying an operating voltage received thereby to produce a supply voltage, which is delivered to the drive motor, as a function of the actuating signal of the speed controller, and an evaluation means for determining the existence of incipient clamping based on a signal which is a function of the actuating signal of the speed controller and which issues a clamping signal when incipient clamping is determined to exist, said clamping protection means being connected between said actuating means and said motor and being actuated in response to issuance of said clamping signal by said evaluation means.

2. Drive device according to claim 1, wherein a first input of the evaluation means is connected to receive the actuating signal of the speed controller and a second input of the evaluation means is connected to receive said operating voltage.

3. Drive device according to claim 1, wherein the evaluation means has an input which receives a signal which corresponds to said supply voltage.

4. Drive device according to claim 1, wherein the evaluation means has an input which receives the actuating signal of the speed controller; and wherein a voltage regulator is connected between the speed controller and the drive motor, said voltage regulator delivering a supply voltage to the drive motor which is corrected to the actuating signal of the speed controller regardless of said operating voltage.

5. Drive device according to claim 1, wherein the closing parts are a vehicle sunroof.

* * * * *